United States Patent [19]

Baranne et al.

[11] Patent Number: 5,285,255
[45] Date of Patent: Feb. 8, 1994

[54] OPTICAL SYSTEM FOR SPECTRAL ANALYSIS

[75] Inventors: Andre Baranne, Cabriès, France; Francis Pilloud, Clarens, Switzerland

[73] Assignee: Fisons plc, England

[21] Appl. No.: 538,118

[22] Filed: Jun. 14, 1990

[30] Foreign Application Priority Data

Jun. 16, 1989 [GB] United Kingdom ................ 8913897
Dec. 11, 1989 [FR] France ................ 89 16347

[51] Int. Cl.$^5$ .......................... G01J 3/28; G01N 21/00
[52] U.S. Cl. .................................. 356/328; 356/302; 356/334; 356/305
[58] Field of Search .............. 356/333, 334, 326, 328, 356/302

[56] References Cited

U.S. PATENT DOCUMENTS

| Re. 26,053 | 7/1966 | Cary | 356/333 |
|---|---|---|---|
| 3,888,590 | 6/1975 | White | 356/333 |
| 4,326,802 | 4/1982 | Smith, Jr. et al. | 356/316 |
| 4,455,087 | 6/1984 | Allemand et al. | 356/333 |

FOREIGN PATENT DOCUMENTS

| 0098429 | 3/1984 | European Pat. Off. . |
|---|---|---|
| 1434980 | 1/1965 | France . |
| 861639 | 2/1961 | United Kingdom . |

OTHER PUBLICATIONS

*Applied Optics,* vol. 9, No. 10, Oct. 1970, pp. 2332-2336, "High Dispersion Stellar Spectroscope with an Echelle Grating".
*Patent Abstracts of Japan,* vol. 6, No. 198 (P-147) [1076], Oct. 7, 1982.

Primary Examiner—F. L. Evans
Assistant Examiner—K. P. Hantis
Attorney, Agent, or Firm—Marshall, O'Toole, Gernstein, Murray & Bicknell

[57] ABSTRACT

An optical device for the spectral analysis of a light source which comprises a spectrograph assembly including a dispersive element, and a classical collimator. The spectrograph assembly supplies a complete intermediate spectrum at the object focus of the classical collimator and the classical collimator reforms, at its image focus, an image of the dispersive element. The spectrograph assembly is preferably a Czerny-Turner or other type of spectrograph comprising an entry slit, two juxtaposed concave mirrors of the same focal length and a dispersive element placed strictly in the common focal plane of the two mirrors. Most preferably, the classical collimator is the first mirror of the second, similar spectrograph assembly. The device is most advantageous in that it is readily useable for both simultaneous and sequential spectroscopy.

10 Claims, 6 Drawing Sheets

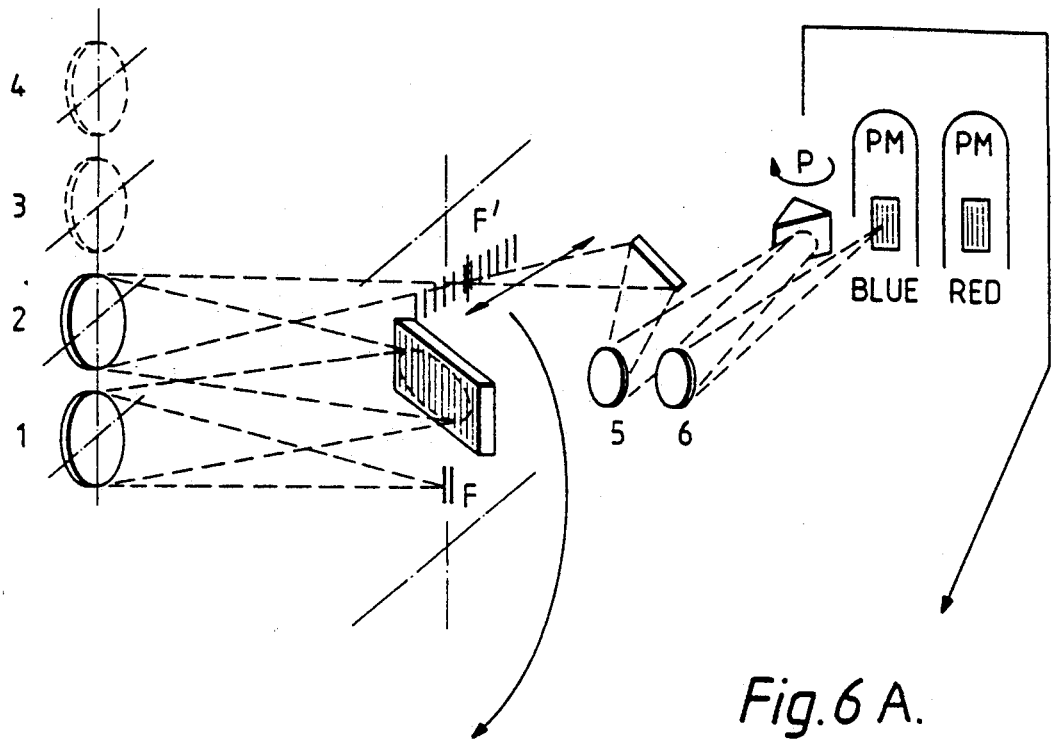
Fig.6.
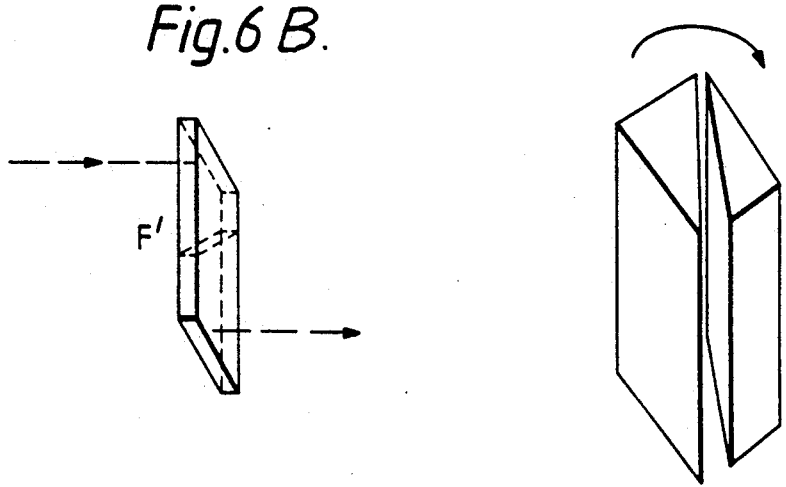
Fig.6 B.
Fig.6 A.

OPTICAL SYSTEM FOR SPECTRAL ANALYSIS

This invention relates to optical devices for use in the spectral analysis of light, i.e. to devices for use in spectrographs, spectrometers or colorimeters.

Spectroscopic techniques used in the spectral analysis of light may be broadly divided into two categories: sequential spectroscopy and simultaneous spectroscopy. The former technique involves recording a spectrum wavelength by wavelength using a monochromator to isolate each individual wavelength which is selected by rotating a dispersive element in the monochromator.

In simultaneous spectroscopy, on the other hand, a number of different wavelengths are measured at the same time, typically by means of a static or fixed dispersive element and an array of detectors.

Due to the differing modes of operation of sequential and simultaneous systems, they may have different optical properties and a unit designed for one type of use may be unsuitable for the other.

We have now devised an improved form of optical device for use in the spectral analysis of light which overcomes or substantially mitigates this disadvantage and which has further advantageous properties over known optical systems.

According to the invention there is provided an optical device for the spectral analysis of a light source which comprises a) a spectrograph assembly including a dispersive element, and b) a classical collimator, the device being characterised in that the spectrograph assembly supplies a complete intermediate spectrum at the object focus of the classical collimator and the classical collimator reforms, at its image focus, an image of the dispersive element.

The optical device according to the invention is advantageous in that it is readily usable for both simultaneous and sequential measurements. In addition, aberrations due to, for example, eccentricities are minimised. The device may be made relatively compact and in such a manner that all the components are located in one or two planes. This minimises errors introduced by thermal expansion etc.

The intermediate spectrum is a dispersed image of the entry slit of the spectrograph assembly.

The spectrograph assembly is most conveniently a Czerny-Turner or other type of spectrograph comprising an entry slit, two juxtaposed concave mirrors of the same focal length and a dispersive element placed strictly in the common focal plane of the two mirrors. As is known, an assembly of this type, called a Z-assembly, has no uneven aberrations (such as distortion) provided that the angles of incidence on the two mirrors are the same.

The dispersive element is preferably a grating, most preferably an echelle grating. Echelle gratings are preferred since they give greater dispersion. The grating is most preferably used in conical dispersion.

According to a preferred aspect of the invention, therefore, there is provided an optical device for the spectral analysis of a light source, which comprises a Czerny-Turner or other type of spectrograph comprising an entry slit, two juxtaposed concave mirrors of the same focal length and a grating in the common focal plane of the two mirrors, the grating being used in conical dispersion, the spectrograph supplying at the object focus of the classical collimator a complete intermediate spectrum, and the classical collimator reforming at its image focus an image of the grating.

Such a Z-assembly does, however, have two troublesome aberrations: spherical aberration if the apertures are large, and astigmatism which increases as the square of the angles of incidence on the mirrors, with the consequence that eccentricity must be kept to a minimum.

When the dispersive element is an echelle grating, it is necessary to disperse the orders perpendicularly by means of a secondary disperser. This effect is classically obtained by a double-passage prism placed in front of the echelle grating. However, this prism is generally much larger than the grating and dispersion in the red is much smaller than in the ultraviolet, which limits the height of the slit (to avoid overlap of images of different orders). The angles of incidence on the mirrors are large, which increases astigmatism. With plane diffraction (incident rays diffracted perpendicular to the grating lines) these angles are large and limit the apertures which are already limited by the risks of parasitic spectra (Cary's rule). With conical diffraction (incident and diffracted rays in the same plane parallel to the grating lines and containing the blaze axis) these excessive angles induce curvature of the spectrum and differences in slope, which are troublesome for monochromatic images of the slit.

These problems are resolved in a preferred aspect of the invention by combining two successive Czerny-Turner arrangements (of the same type) such that the classical collimator is the first mirror of the second Czerny-Turner spectrograph. The first and second Czerny-Turner spectrographs are hereinafter called the first and second stages.

Preferably, the first stage comprises an echelle grating used for conical dispersion; the Littrow assembly conditions may be used and the angles of eccentricity reduced to a minimum. This results in better luminosity and little deformation in the intermediate spectrum in which all orders are superimposed.

In the second stage, a second dispersive element, which may be a back-reflection prism or a classical grating, disperses the intermediate spectrum in the final sagittal plane which coincides with the plane of the dispersive elements. As is known, if the intermediate and final images are subject to spherical aberration and astigmatism, the sagittals are effectively contained in this plane. It is preferred that the second dispersive element be a back-reflection prism since this gives better resolution in the ultra-violet range of the spectrum.

A further advantage of the two-stage arrangement is that the prism is reduced to its minimum dimensions which may be made completely independent of the dimensions of the echelle grating used in the first stage. Also, in the two-stage design, the size of the second dispersive element may be made similar to that of the first. This is smaller than is usual and results in lower cost. Where a prism is used, it may be made relatively thin which results in reduced absorption of light and hence improved light intensity.

For reasons of mechanical compactness, it is advantageous to 'fold' the second stage over the first by means of, for example, a total reflection prism at the level of the intermediate spectrum. This enables all the optical elements of the device to be distributed over two parallel planes, hereafter called 'sides'. The first side then comprises four mirrors joined along parallel axes; the second, facing side comprises the remainder of the optical elements (entry slit, echelle grating, intermediate spectrum, total reflection prism, back-reflection prism and final image). This arrangement has considerable advantages, notably simplicity of construction and reduction of errors due to, for example, thermal expansion of the unit.

As an alternative to the total reflection prism, a pair of plane mirrors may be used to 'fold' second stages (the two mirrors acting analogously to the two internal faces of the prism at which reflection occurs).

Because of the variations in the intensities of the various spectral lines, it may be advantageous to place a mask immediately in front of the total reflection prism so as to suppress, or even eliminate altogether, certain lines in the spectrum. The mask may, for example, permit the passage of more light in the ultraviolet where there is little light and where the dispersion due to the prism is great than in the red where there is much light and the prism causes little dispersion. It is also possible to suppress or eliminate altogether any unwanted lines, for example particularly strong lines which interfere with other measurements.

It is desirable to construct the system in such a way as to correct for spherical aberration and astigmatism. This can only be undertaken at three points: at the first mirror of the first stage, or at either of the dispersive elements, since on the other mirrors the beams are dispersed.

For a spectrometer (with a single entry slit) the preferred solution is to correct the aberrations of the first stage on the first mirror and the aberrations of the second stage on the second dispersive element. Indeed, the first mirror can provide the total correction for the two stages. In this case, the first mirror is an astigmatic hyperboloid with an axis of symmetry parallel to the axes of the other mirrors, the coefficient of hyperbolic deformation being equal to the negative of the number of mirrors in the corrected system (i.e. $-4$ if there are 4 mirrors of the same radius of curvature), the difference between the principal radii of curvature of the hyperboloid depending on the angles of eccentricity and their orientation.

There is therefore inversion of the two aberrations at the level of the intermediate spectrum. This is not problematic since the sagittal image precedes the tangential where a geometric mask may be placed to limit the height of the rays.

A significant advantage of the two-stage device is the possibility of improving the image quality by differential vignetting in each range of wavelength. It is found that in the orders of an echelle grating, the blue orders are linearly shorter than the red orders. The images for blue wavelengths are therefore closer to the axis and of better quality than the extreme images of the red orders. The red can be vignetted separately without any disadvantage, since in this region there is more than enough light. The effect is obtained by giving an oval contour to the second mirror of the first stage and the first mirror of the second stage. Following inversion of the pupils at the level of the intermediate spectrum, only the central part of the pupil will be retained for the final images. This allows the use of a grating with a larger number of lines as the primary disperser, and thus the orders are more readily separable and a prism of smaller angle may be used in the second stage.

The strict telecentrism of the final and intermediate images makes the device less sensitive to expansion or contraction if the optical elements are themselves insensitive to thermal variations. This telecentrism allows the intermediate spectrum to be used for sequential spectroscopy. For this purpose, a 'sequential unit' may be inserted at the level of the intermediate spectrum. This sequential unit is a compact assembly of small dimensions which may be displaced along the intermediate spectrum. It conveniently comprises a rhomboidal prism to divert the light to a Czerny-Turner unit in which the disperser is a prism. This prism has an edge parallel to the slit so that secondary dispersion is in the same direction as the dispersion due to the grating. The prism may be rotated so that light of the chosen wavelength appears in an exit slit. The rhomboidal prism used to divert the light to the Czerny-Turner unit is conveniently very thin so that it may be placed in front of the geometric mask, if used. This means that the entry slit to the sequential unit is of unlimited height.

The wavelengths selected by the entry slit of the sequential unit are distributed discretely according to the law $K=$ constant. They are therefore fairly well separated from each other and the focal lengths of the Czerny-Turner mirrors may be short and the exit slit may be large. Since a single detector is generally not suitable for the whole spectral range of interest, it is preferred to use one detector for the blue wavelength range and another for the red end of the spectrum. In this case, the disperser prism is conveniently an assembly of two interchangeable prisms, selection of the appropriate detector being made by selection of the corresponding prism.

Where a sequential unit is used, the residual aberrations of the system may be corrected at the first stage and the sequential unit, aberrations of the first stage being corrected at the first mirror by an astigmatic hyperboloid whose coefficient of deformation is $-2$, and aberrations of the second stage being corrected at the prism by a Schmidt optic.

The sequential recording of a range of wavelengths involves two linked movements: linear displacement of the sequential unit, and rotation of its prism.

It should be noted that the entry slit of the sequential unit must be rectilinear and parallel to the edge of the prism. For this, it is convenient to give the general entry slit of the device a suitable inclination and, possibly, curvature to compensate for the effect due to the echelle grating used in conical dispersion.

Instead of, or in addition to, the sequential unit there may be provided one or more fixed units at the level of the intermediate spectrum, each fixed unit being dedicated to measurement of one spectral line. The use of such a fixed unit is particularly useful where a spectral line of interest occurs in the ultraviolet and hence where absorption in the components (prisms etc) of the later stages of the device may be problematic. An example is the determination of nitrogen, e.g. in steel.

The fixed unit is conveniently, with the exception of being fixed, of similar construction to the sequential unit, i.e. it may comprise a small mirror or prism to divert light into a compact Czerny-Turner assembly provided with an appropriately positioned exit slit and photomultiplier.

In astronomical optics, a device of this type can be used with the difference that the image field furnished by the focal length of the telescope is too large for the detector used, and the dimensions of a stellar image magnified by atmospheric turbulence is larger than the pixel of the detector. It is therefore necessary to combine the device with a focal reducer. The image supplied by the telescope being telecentric and the objective, intermediate and image spaces of the device being monochromatically homomorphous, a focal reducer used directly inside the telescope may be at the intermediate focus or at the final focus of the device.

The internal pupil of a focal astronomical reducer generally being real and usable, a secondary disperser can be put in place if necessary. The fact that the same focal reducer may be used either at the direct focus of the telescope or at the exit from any of the stages means that the minimum optical device is in service at any one time.

The focal reducer may be catadioptric, in which case the device may be made more compact. The collimator of the said focal reducer is then a mirror identical to the Czerny-Turner mirrors. A dioptric objective of arbitrary design may then be placed in the second pupil to provide the necessary focal reduction.

If the primary disperser is a grating working in the first order, the device is used as such; in the case where the disperser is an echelle grating, it is best to place a secondary disperser before the objective.

As before, correction of spherical aberration and of astigmatism is undertaken according to the number of mirrors and the eccentricity. A particular case of relevance to astronomical optics is the use of multiple entry slits (multislit spectrographs). Correction of the aberrations can then only be performed at the pupil level either by deforming the grating surface or by inserting a Schmidt, double-passage, astigmatic screen before the grating. In an astronomical spectrograph this is justified since such a complex optical device does not significantly affect its purchase price.

It is clear that the number of stages is not limited to one or two, and that several identical systems can be juxtaposed for a very large astronomical field.

The optical device according to the invention is of use in any application involving the spectral analysis of light. One particular type of instrument in which the device may be used is an optical emission spectrometer.

The invention will now be described in detail with reference to the accompanying drawings in which FIG. 1 shows the known Czerny-Turner scheme for conical diffraction (over-under type), FIG. 2 shows an optical device comprising two successive Czerny-Turner units, FIG. 3 shows the same assembly as FIG. 2, folded by a total reflection prism so that the optical elements are divided into two parallel planes, FIG. 4 shows a geometric mask which is placed in the plane of the intermediate spectral image of the assembly of FIG. 3, FIG. 5 shows geometric diaphragms which are placed on mirrors 2 and 3 of FIG. 3, FIG. 6 shows a mobile sequential unit located behind the intermediate spectral image of the assembly of FIG. 3, FIG. 6A shows an enlargement of a disperser prism of the sequential unit of FIG. 6, FIG. 6B shows an enlargement of a rhomboidal entry prism forming part of the sequential unit of FIG. 6, FIG. 7 shows the use of a device according to the invention in an astronomical telescope, FIG. 7A shows a double stage arrangement for astronomical use, FIG. 7B shows a multi-stage folded system for astronomical use, FIG. 8 shows a device used with a catadioptric reducer where the grating used operates in the first order, and FIG. 8A shows the diagram of a device similar to that of FIG. 8 where the grating used is an echelle.

Referring first to FIG. 1, the known Czerny-Turner scheme for conical diffraction comprises an entry slit (11), first and second concave mirrors (12,13 respectively) and a dispersive element (14) which may be a grating. The apparatus produces a spectral image (15).

In the present invention this assembly is supplemented by a classical collimator which sends the spectral image (15) from the Czerny-Turner unit to infinity by refocussing at its image focus the image of the dispersive element (14).

FIG. 2 shows such a device according to the invention in which the classical collimator is the first mirror of a second Czerny-Turner arrangement. The disperser of the first Czerny-Turner is an echelle grating (26) and the disperser of the second Czerny-Turner is a prism (27) which disperses the orders perpendicularly; this assembly allows reduction of the eccentric angles and permits the grating dimensions to be made independent of the prism dimensions. In this case, the focal length of the second Czerny-Turner unit is greater than that of the first.

FIG. 3 depicts a similar system in which the two Czerny-Turner units are folded by a total reflection prism (33). This has the advantage of mechanical compactness, the four mirrors (1,2,3,4) of the two Czerny-Turner units being arranged in the same plane and the remaining components in a facing plane. These remaining components are an entry slit (31), echelle grating (32), total reflection prism (33) and prism (34). In this case, the focal lengths of the two Czerny-Turner units are very similar.

A geometric mask (35) is mounted in the plane of the intermediate spectrum and serves to limit the height of that spectrum at particular wavelengths. A typical form of the mask (35) is shown more clearly in FIG. 4. The line F' represents a monochromatic image of the general entry slit of the device, showing how the height of the image is limited by the geometric mask.

Similarly, the shapes of the mirrors (1,2,3,4) and the shapes of the geometric diaphragms which are placed on the mirrors (1,2,3,4) are shown in FIG. 5. These diaphragms limit, in the red, the monochromatic pupils furthest from the axis to their central portions. The pupil is not limited by the diaphragm along the axis of symmetry, but is at the base of the fourth mirror (4); the dashed lines trace these monochromatic pupils (at the edge of the third mirror (3) it is, in fact, the image of the second mirror (2)).

A mobile sequential unit is positioned immediately behind the intermediate spectrum as shown in FIG. 6. This sequential unit comprises a further Czerny-Turner unit comprising an entry slit (F'), first and second mirrors (5,6 respectively) and a prism (P) as disperser. Secondary dispersion due to the prism (P) is in the same direction as that due to the grating of the first Czerny-Turner unit. The prism (P) is rotatable so that light of the desired wavelength may be brought into registration with an exit slit and be detected by a photomultiplier (PM).

As shown in FIG. 6A, the prism (P) is actually an assembly of two prisms, selection of the more appropriate prism for the particular spectral line under investigation being made by simply rotating the assembly. Two photomultipliers (PM) are also used, one for the red region of the spectrum and one for the blue.

In use, simultaneous spectroscopic measurements are carried out with the apparatus as shown in FIG. 3. Light from some or all the slits (i.e. light of the wavelengths of interest) in an exit slit mask (not shown) is channelled to an array of photomultipliers (not shown) in a conventional manner, e.g. using fibre otpics.

For sequential measurements, the rhomboidal prism shown in FIG. 6B is moved to a position in front of the mask (35) so as to deflect the light of interest into the sequential unit. The particular wavelength of interest is selected by rotation of the prism (P) and the intensity of the light is measured by the appropriate photomultiplier (PM).

The device used in an astronomical telescope (70), as shown in FIG. 7, comprises first and second mirrors (1,2 respectively), a primary grating (R1) used in conical diffraction mode, and a focal reducer (RF). The image from the telescope (70) is focussed at F, which coincides with the entry slit to the device, and is refocussed at F'. In this case the classical collimator is the dioptric collimator of the focal reducer.

For various reasons, e.g. use of an echelle, separation of the blue and red domains, etc, it may be desirable for the focus (F) of the telescope to occupy any one of the remaining foci (F',F'',F'''). This may be accomplished by the use of plane mirrors. At least one of the pupils of the system is fitted with a grating used in conical diffraction.

Figure 1:
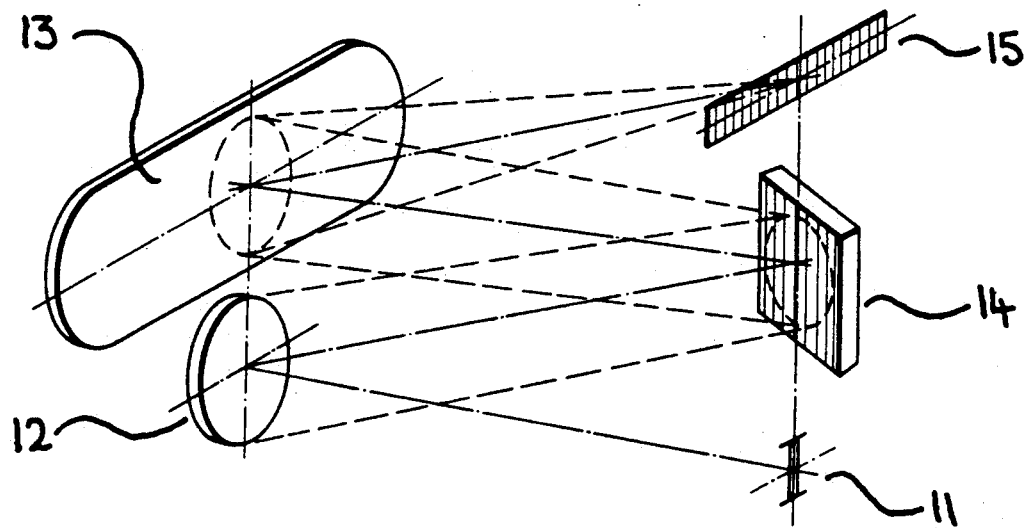
Figure 2:
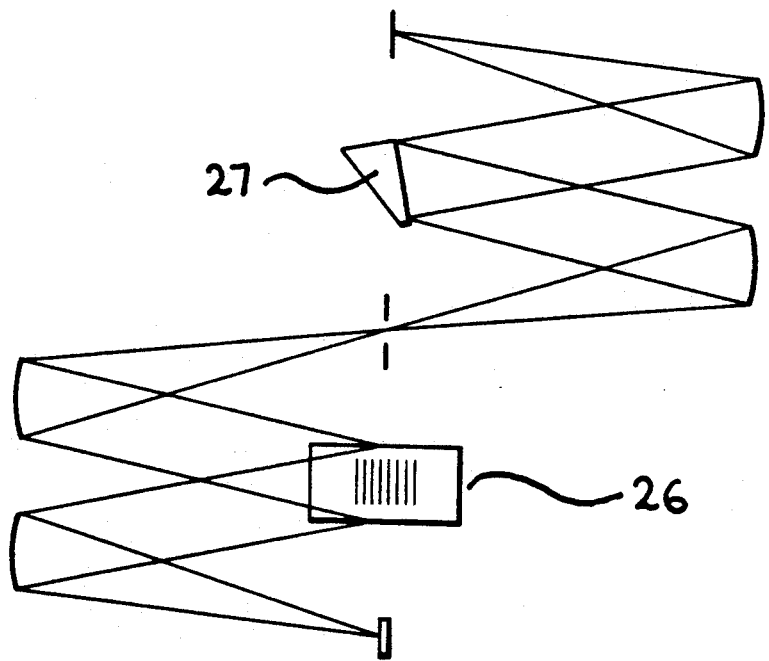
Figure 3:
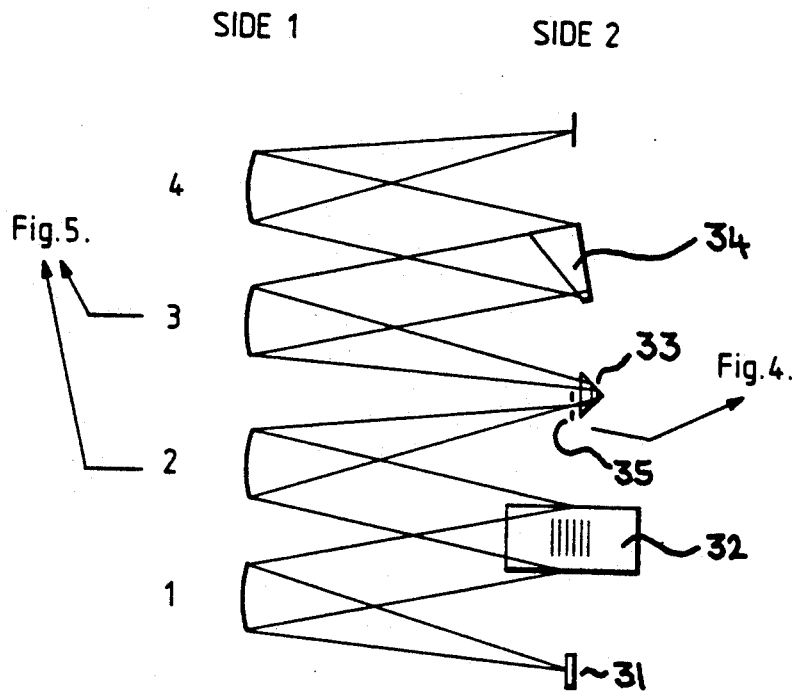
Figure 4:
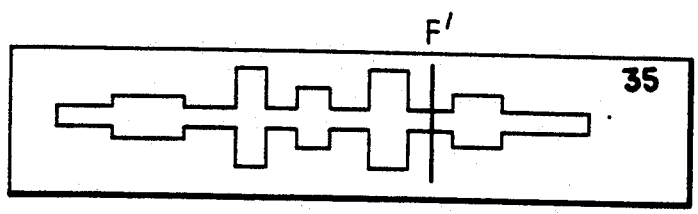
Figure 5:
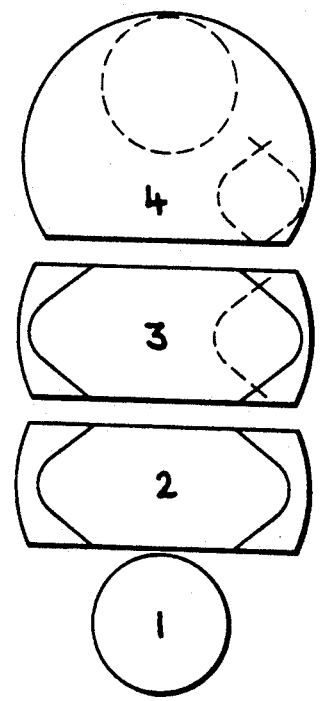
Figure 7:
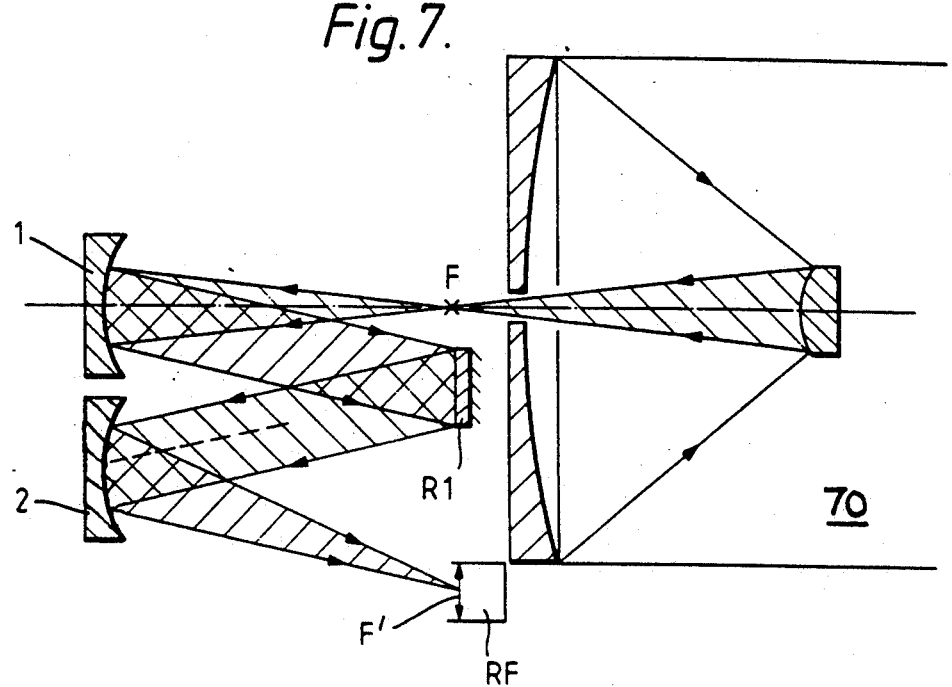
FIG. 7A shows a two-stage device comprising 4 mirrors (1–4), a grating (R1) and a prism (DS) as disperser in the second stage, the final spectrum being received by the focal reducer (RF).
FIG. 7B shows a three stage system in which the concave mirrors (1-6) lie in the same plane. The successive foci (F,F',F'',F''') lie in a facing, parallel plane where they alternate with the successive pupils (P1,P2,P3).
Figure 7A:
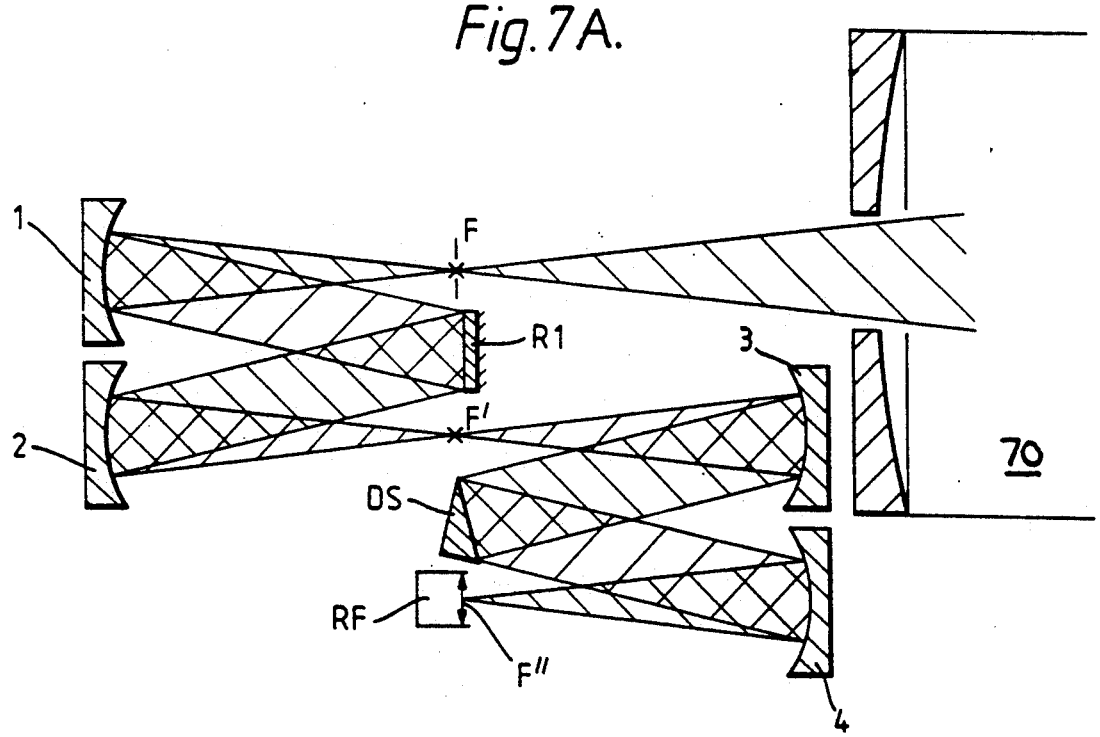
Figure 7:
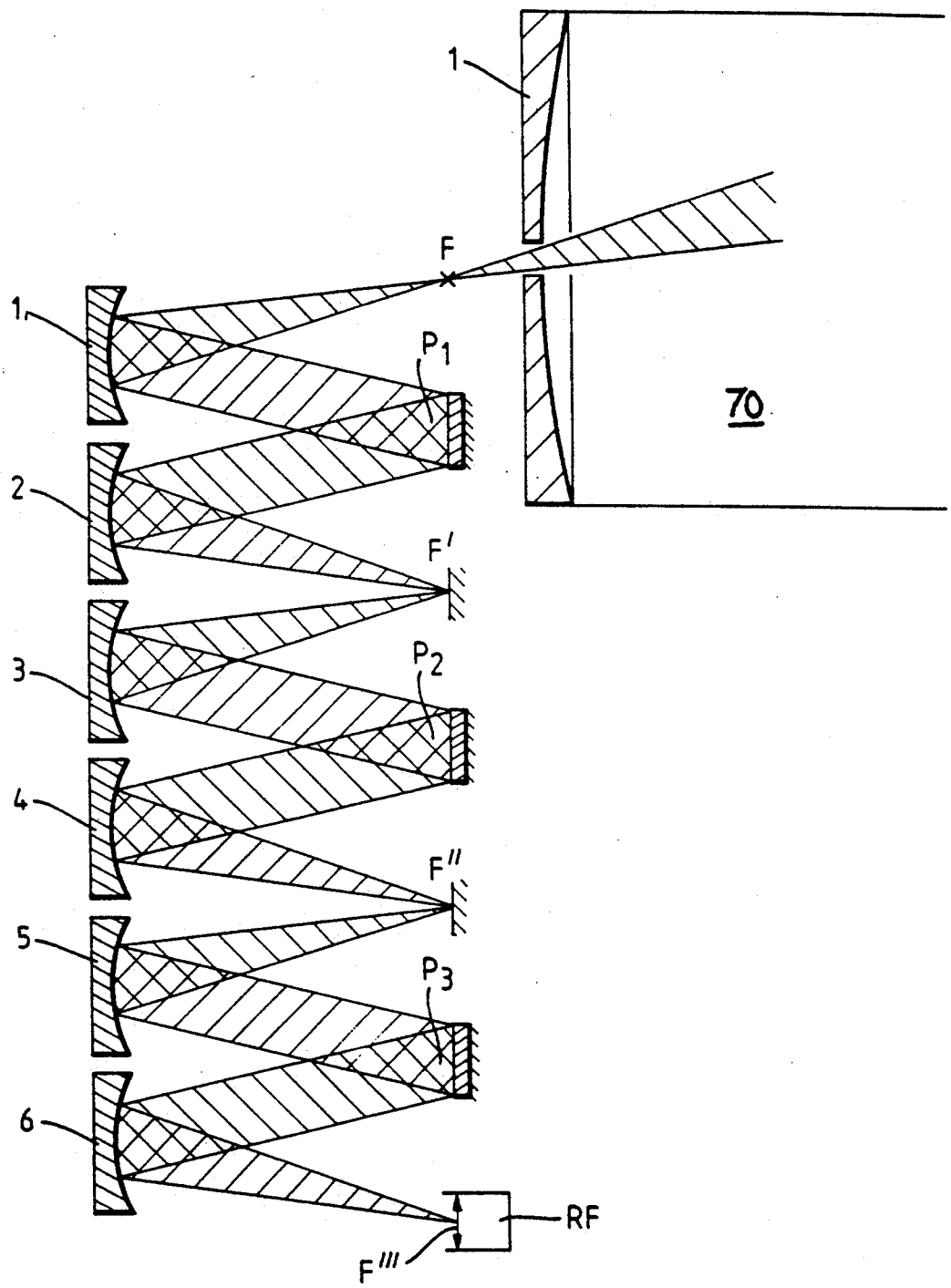
Figure 8:
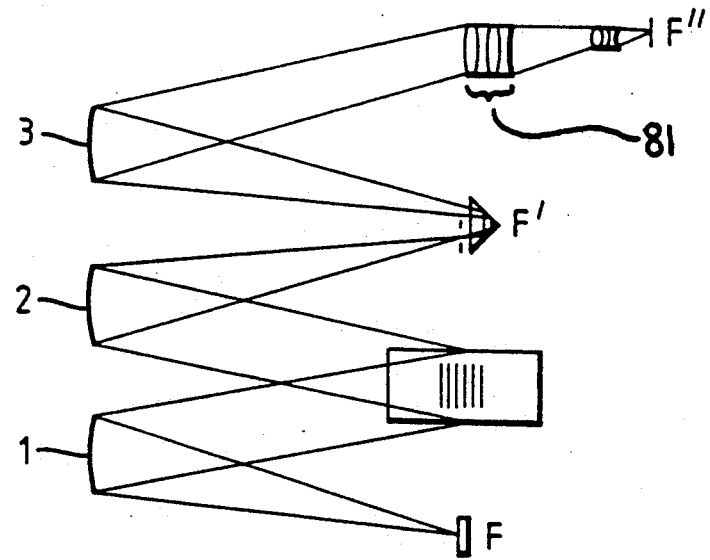

FIG. 8 shows a system in which the classical collimator is a mirror (3) which reforms at its image focus a second pupil. A classical chamber objective (81) is placed in this second pupil, the mirror (3) and the chamber objective (81) together acting as a catadioptric focal reducer.

Figure 8A:
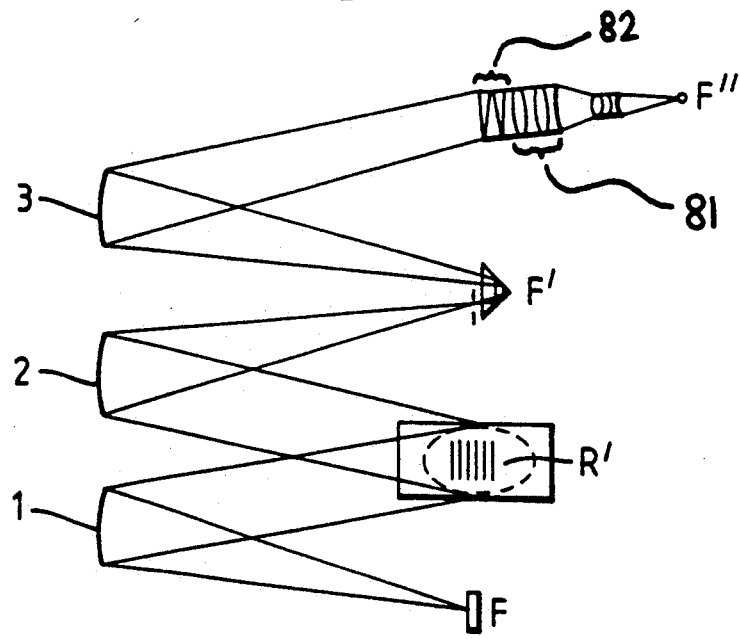

FIG. 8A shows a similar system with the difference that the primary disperser is an echelle grating (R') and that a secondary disperser (82) is included in front of the chamber objective (81). The secondary disperser (82) is a composite disperser (prism+grating).

We claim:

1. An optical device for the spectral analysis of a light source which comprises a) a spectrograph assembly including a fixed dispersive element, and b) a classical collimator, wherein the spectrograph assembly supplies a complete intermediate spectrum at the object focus of the classical collimator and the classical collimator reforms, at its image focus, an image of the dispersive element.

2. An optical device according to claim 1, wherein the spectrograph assembly compromises an entry slit, two juxtaposed concave mirrors of the same focal length and a fixed dispersive element placed strictly in the common focal plane of the two mirrors.

3. An optical device according to claim 1, wherein the fixed dispersive element is an echelle grating used in conical dispersion.

4. An optical device for the spectral analysis of a light source which comprises (a) a first stage comprising an entry slit, two juxtaposed concave mirrors of the same focal length and a fixed dispersive element placed strictly in the common focal plane of the two mirrors, and (b) a second stage comprising an entry slit, two juxtaposed concave mirrors of the same focal length and a fixed dispersive element placed strictly in the common focal plane of two mirrors, the first mirror of the second stage being a classical collimator which reforms, at its image focus, an image of the fixed dispersive element of the first stage, and where the first stage supplies a complete intermediate spectrum at the object focus of the classical collimator.

5. An optical device according to claim 4, wherein the dispersive element of the second stage is a back-reflection prism.

6. An optical device according to claim 4, wherein the the second stage is 'folded' over the first such that all optical elements of the device are located in two parallel planes, one plane including four mirrors joined along parallel axes and the second facing plane comprising the remainder of the optical elements.

7. An optical device according to claim 6, wherein a mask is located at the level of the intermediate spectrum so as to suppress, or eliminate, certain lines in the spectrum.

8. An optical device according to claim 4, wherein an oval contour is given to the second mirror of the first stage and the first mirror of the second stage so as to selectively vignette red orders of the fixed dispersive element.

9. An optical device according to claim 6, wherein a sequential unit is provided at the level of the intermediate spectrum, and a rhomboidal prism is positioned in front of a mask at the intermediate spectrum to divert light of interest into the sequential unit.

10. An optical emission spectrometer comprising an optical device for the spectral analysis of a light source which comprises (a) a spectrograph assembly including a fixed dispersive element, and (b) a classical collimator, wherein the spectrograph assembly supplies a complete intermediate spectrum at the object focus of the classical collimator and the classical collimator reforms, at its image focus, an image of the dispersive element.

* * * * *